(12) United States Patent
Skotnicki

(10) Patent No.: US 8,773,003 B2
(45) Date of Patent: Jul. 8, 2014

(54) THERMOELECTRIC GENERATOR

(75) Inventor: Thomas Skotnicki, Crolles-Monfort (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 0 days.

(21) Appl. No.: 13/410,308

(22) Filed: Mar. 2, 2012

(65) Prior Publication Data

US 2012/0228992 A1 Sep. 13, 2012

(30) Foreign Application Priority Data

Mar. 9, 2011 (FR) .................................. 11 51929

(51) Int. Cl.
*H02N 10/00* (2006.01)
(52) U.S. Cl.
USPC .......................................... 310/339; 310/306
(58) Field of Classification Search
CPC ..................................................... H02N 10/00
USPC ........................... 310/311, 328–332, 339, 306
See application file for complete search history.

(56) References Cited

U.S. PATENT DOCUMENTS

| | | | |
|---|---|---|---|
| 5,621,264 A | 4/1997 | Epstein et al. | |
| 6,670,686 B2 * | 12/2003 | Jaouen et al. | 257/416 |
| 8,227,955 B1 * | 7/2012 | Mitchell et al. | 310/339 |
| 8,344,586 B2 * | 1/2013 | Mitchell et al. | 310/307 |
| 2001/0032663 A1 | 10/2001 | Pelrine et al. | |
| 2002/0043895 A1 | 4/2002 | Richards et al. | |
| 2003/0052355 A1 * | 3/2003 | Jaouen et al. | 257/303 |
| 2008/0202114 A1 | 8/2008 | Naterer et al. | |
| 2011/0095655 A1 * | 4/2011 | Skotnicki | 310/339 |
| 2011/0240622 A1 * | 10/2011 | Sanchez et al. | 219/201 |
| 2011/0277815 A1 * | 11/2011 | Sankrithi | 136/246 |
| 2012/0060885 A1 * | 3/2012 | Makansi et al. | 136/206 |
| 2012/0153905 A1 * | 6/2012 | Skotnicki et al. | 322/2 A |
| 2012/0198616 A1 * | 8/2012 | Makansi et al. | 5/423 |
| 2012/0237364 A1 * | 9/2012 | Sanchez et al. | 417/53 |
| 2013/0015549 A1 * | 1/2013 | Fornara et al. | 257/467 |
| 2013/0224853 A1 * | 8/2013 | van Walsem et al. | 435/292.1 |

OTHER PUBLICATIONS

French Search Report and Written Opinion dated Oct. 6, 2011from corresponding French Application No. 11/51929.

* cited by examiner

*Primary Examiner* — J. San Martin
(74) *Attorney, Agent, or Firm* — Wolf, Greenfield & Sacks, P.C.

(57) ABSTRACT

A thermoelectric generator including a sheet of a deformable material containing closed cavities, each of which contains a drop of a vaporizable liquid, and a mechanism for transforming into electricity the power resulting from the deformation of the sheet linked to the evaporation/condensation of the liquid.

18 Claims, 1 Drawing Sheet

THERMOELECTRIC GENERATOR

CROSS REFERENCE TO RELATED APPLICATIONS

This application claims the priority benefit of French patent application number 11/51929, filed on Mar. 9, 2011, entitled THERMOELECTRIC GENERATOR, which is hereby incorporated by reference to the maximum extent allowable by law.

BACKGROUND

1. Technical Field

Embodiments relate to a thermoelectric generator, that is, a device capable of generating electric power from a temperature difference, in the presence of a hot source and of a cold source.

2. Discussion of the Related Art

Currently, the most common thermoelectric generators are photovoltaic generators which convert the power of solar radiation photons into electric power.

Various means have been provided to manufacture such generators in the form of sheets of large surface area. However, photovoltaic generators remain expensive.

There thus is a need for thermoelectric generators of large surface area and low cost.

SUMMARY

An embodiment aims at fulfilling at least the above-mentioned need.

Embodiments provide a thermoelectric generator capable of being manufactured in the form of a sheet of large surface area that can be applied against a hot surface, its other surface being cooled down by any means, for example, by the ambient air.

Thus, an embodiment provides a thermoelectric generator comprising a sheet of a deformable material containing closed cavities, each of which contains a drop of a vaporizable liquid, and means for transforming into electricity the power resulting from the deformation of the sheet linked to the evaporation/condensation of the liquid.

According to an embodiment, the sheet of a deformable material containing the cavities is coated with a first conductive layer connected to a first electrode, with a layer of a piezoelectric material, and with a second conductive layer connected to a second electrode.

According to an embodiment, the layer of a deformable material containing the closed cavities is a bubble film.

According to an embodiment, the liquid comprises an alcohol.

According to an embodiment, the cavities have dimensions approximately ranging from 0.1 mm to 10 cm.

According to an embodiment, the generator comprises means for transporting by capillary action, the drop from one wall to another of each cavity.

According to an embodiment, the cavities are lined with a fibrous material.

According to an embodiment, the cavities contain a fibrous material.

The foregoing and other objects, features, and advantages will be discussed in detail in the following non-limiting description of specific embodiments in connection with the accompanying drawings.

BRIEF DESCRIPTION OF THE DRAWINGS

For clarity, the same elements have been designated with the same reference numerals in the different drawings and the various drawings are not to scale.

DESCRIPTION

It is desired to convert thermal power into mechanical power by using the volume and pressure variations caused by cycles of evaporation/condensation of a liquid. The mechanical power thus created is then converted into electric power.

More specifically, embodiments provide using a sheet of a deformable material containing cavities (bubbles). A small amount of a vaporizable liquid is arranged in each cavity (each bubble). The upper surface of the sheet is turned towards a cold source and the lower surface of the sheet is turned towards a hot source. The hot source and the cold source, respectively, are at a temperature greater and at a temperature lower than the evaporation temperature of the liquid. Thus, the liquid undergoes alternations of evaporation and condensation. This results in alternated inflations and deflations of each of the bubbles and in a cyclic deformation of the sheet. This cyclic deformation of the sheet may be used by any means to generate power. The deformations of a piezoelectric material linked to the sheet may, for example, be used.

Figure 1A:
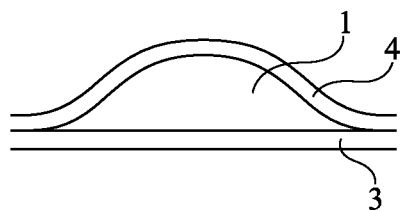
FIGS. 1A, 1B, 1C are simplified cross-section views illustrating the phenomenon implemented by a thermoelectric generator according to an embodiment.
Figure 1B:
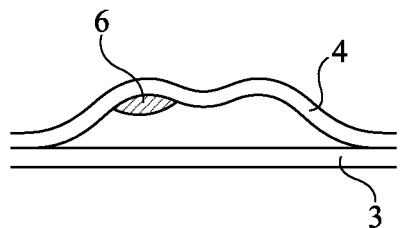
Figure 1C:
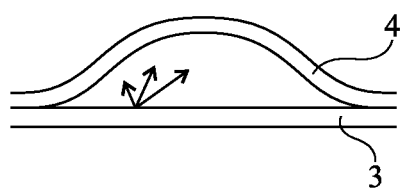

The phenomenon used herein will be illustrated in relation with FIGS. 1A, 1B, and 1C.

In FIG. 1A, a cavity or bubble 1 delimited by a resiliently deformable envelope comprising a lower wall 3 and an upper wall 4 is considered. It should incidentally be noted that sheets containing bubbles are currently manufactured and called "bubble films". Such bubble films are especially used to wrap fragile objects for their transportation. Bubble 1 contains a small amount (a drop) of a vaporizable liquid. In the state illustrated in FIG. 1A, the liquid is considered to be in the vapor state. The bubble is thus inflated.

It is here considered that the high side of FIG. 1A is turned towards a cold source and that its low side is turned towards a hot source.

Then, as illustrated in FIG. 1B, a drop 6 of the liquid present in the bubble will condense on cold wall 4. The bubble is then deflated.

Then, as illustrated in FIG. 1C, as soon as drop 6 reaches a sufficient volume, it falls back under the effect of its weight or runs down along wall 4 towards lower hot wall 3 where it vaporizes again, and the bubble inflates back. Thus, the bubble tends to cyclically increase and decrease its volume.

Of course, the liquid arranged in the deformable material containing cavity or bubble 1 will be selected so that the evaporation temperature of the liquid, at the pressure existing in the bubble, is smaller than the temperature of the hot wall and is greater than the temperature of the cold wall. Various formulations of alcohol or other product may especially be used. In practice, for the temperatures of the hot and cold walls to respectively be approximately distant by ±15° from the evaporation temperature of the liquid contained in the bubble appears to be sufficient to have a proper operation of the system which will be described hereafter.

Various means may be used to use the cyclic expansion of the bubble film to transform this mechanical movement into electric power.

Figure 2:
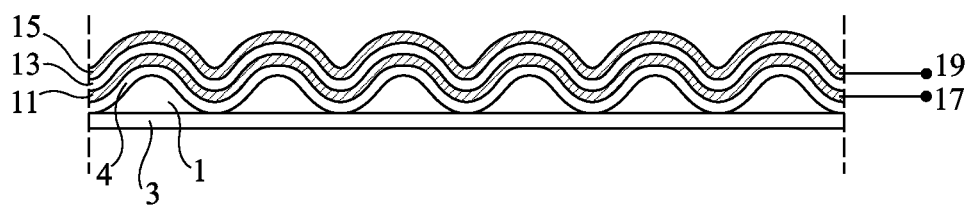
FIG. 2 is a simplified cross-section view of a thermoelectric generator sheet according to an embodiment.

An embodiment illustrated as an example in FIG. 2 comprises using the piezoelectric effect. On the sheet containing the bubbles are successively deposited a first conductive layer, for example, a metal layer 11, a layer of a piezoelectric material 13, and a second conductive layer, for example, a metal layer 15. In use, one surface or the other of the obtained sheet will be facing upwards and put in relation with a cold source. In the representation of FIG. 2, the lower surface of the structure may be attached to a rigid surface to maximize deformations on the side of the piezoelectric material layer.

Metal layers 11 and 15 are respectively connected to a first and to a second electrode 17 and 19 from which a voltage resulting from the deformation transmitted to the piezoelectric material layer may be collected.

Various means may be used to deposit the metal layers. Methods using the simultaneous projection of a liquid salt of a metal and of a liquid catalyst may for example be used. Layer 13 of a piezoelectric material may be obtained for a flexible spun-on organic vinyl.

The case where the material containing the expandable cavities is a "bubble film" has been more specifically described herein. Actually, any resiliently-deformable material containing cavities into which a drop of a liquid can be injected on manufacturing may be used. Rubbers containing cavities or plastic sheets separated by a grid to which they are attached may for example be used.

Figure 3:
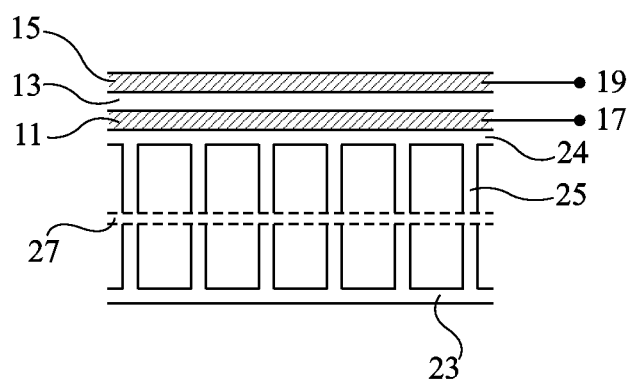
FIG. 3 is a simplified cross-section view of a thermoelectric generator sheet according to another embodiment.

FIG. 3 shows an embodiment in which a first sheet 23 is superposed to a second sheet 24 to which it is connected by a grid of tight partitions 25 to define cylindrical cavities. The structure may, if desired, be constructed in two steps, where a porous sheet 27 letting through the vapor and the liquid will be arranged between sheets 23 and 24. A first conductive layer 11, a layer 13 of a piezoelectric material, and a second conductive layer 15 are placed on top of sheet 24. Conductive layers 11 and 15 are connected to respective electrodes 17 and 19.

A sheet according to one embodiment may be obtained from a roll of large width (on the order of one meter) and great length (up to several hundreds of meters).

The cavities in which the evaporation/condensation cycles occur may have dimensions selected according to the technology used, for example, approximately ranging from 0.1 mm to 10 cm.

A great number of applications may be envisaged. It should however, be noted that the previously-described embodiments necessitate, whatever the direction in which the sheet is turned, that its upper surface faces a cold source and its lower surface faces a hot source so that the drops can fall back under the effect of their weight. It may be advantageous in certain applications to have a generator operating whatever the mutual orientation in space of the hot and cold sources.

Thus, according to an alternative embodiment, means ensuring the transfer by capillary action of the condensed drops from one wall to the other of the device are provided. To achieve this, as an example, it may be provided to line the walls of cavities 1 with a fibrous material or to insert, in these cavities, a fibrous material of cotton wool type or a very light foam.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A thermoelectric generator comprising:
a sheet of a deformable material formed of a bubble film containing closed cavities, each of which contains a vaporizable liquid, and means for transforming into electricity power resulting from deformation of the sheet linked to evaporation and/or condensation of the liquid, wherein at least a first closed cavity is configured to form a drop of the vaporizable liquid during condensation of the vaporizable liquid within the first closed cavity.

2. The thermoelectric generator of claim 1, wherein the sheet of a deformable material containing the cavities is coated with a first conductive layer connected to a first electrode, with a layer of a piezoelectric material, and with a second conductive layer connected to a second electrode.

3. The thermoelectric generator of claim 1, wherein the liquid comprises an alcohol.

4. The thermoelectric generator of claim 1, wherein the cavities have dimensions approximately ranging from 0.1 mm to 10 cm.

5. The thermoelectric generator of claim 1, wherein the cavities are lined with a fibrous material.

6. The thermoelectric generator of claim 5, wherein the cavities contain a fibrous material.

7. The thermoelectric generator of claim 1, wherein the sheet is configured to cyclically increase and decrease its volume when placed in a region comprising a first temperature source having a temperature higher than an evaporation temperature of the liquid, and a second temperature source having a temperature lower than the evaporation temperature of the liquid.

8. The thermoelectric generator of claim 1, wherein the deformation of the sheet is caused, at least in part, by the drop of liquid traveling from a first wall of the first closed cavity to a second wall of the first closed cavity.

9. The thermoelectric generator of claim 8, further comprising means for transporting by capillary said drop from the first wall to the second wall.

10. A thermoelectric generator comprising:
a deformable sheet comprising a plurality of closed cavities, at least a portion of the closed cavities each comprising a vaporizable liquid; and
an energy converter coupled to the sheet and configured to generate electrical power resulting from deformation of the sheet caused at least in part by evaporation and/or condensation of the vaporizable liquid,
wherein at least a first closed cavity of the portion of closed cavities is configured to form at least one droplet of the vaporizable liquid during condensation of the vaporizable liquid within the first closed cavity.

11. The thermoelectric generator of claim 10, wherein the energy converter comprises a first conductive layer connected to a first electrode, a layer of a piezoelectric material, and a second conductive layer connected to a second electrode.

12. The thermoelectric generator of claim 10, wherein the liquid comprises an alcohol.

13. The thermoelectric generator of claim 10, wherein the cavities have dimensions approximately ranging from 0.1 mm to 10 cm.

14. The thermoelectric generator of claim 10, wherein the cavities are lined with a fibrous material.

15. The thermoelectric generator of claim 14, wherein the cavities contain a fibrous material.

16. The thermoelectric generator of claim 10, wherein the sheet is configured to cyclically increase and decrease its volume when placed in a region comprising a first temperature source having a temperature higher than an evaporation temperature of the liquid, and a second temperature source having a temperature lower than the evaporation temperature of the liquid.

17. The thermoelectric generator of claim 10, wherein the deformation of the sheet is caused, at least in part, by the at least one droplet of liquid traveling from a first wall of the first closed cavity to a second wall of the first closed cavity.

18. The thermoelectric generator of claim 17, further comprising means for transporting by capillary the at least one droplet of liquid from the first wall to the second wall.

* * * * *